(12) United States Patent
Chen et al.

(10) Patent No.: US 8,686,969 B2
(45) Date of Patent: Apr. 1, 2014

(54) INPUT APPARATUS WITH INTEGRATED DETECTION SECTIONS OF ELECTROMAGNETIC TYPE AND CAPACITIVE TYPE

(75) Inventors: Wei-Chou Chen, Hsin-Chu (TW); Chia-Te Huang, Hsin-Chu (TW)

(73) Assignee: Waltop International Corporation, Hsin-Chu (TW)

( * ) Notice: Subject to any disclaimer, the term of this patent is extended or adjusted under 35 U.S.C. 154(b) by 175 days.

(21) Appl. No.: 13/026,645

(22) Filed: Feb. 14, 2011

(65) Prior Publication Data
US 2011/0298748 A1 Dec. 8, 2011

(30) Foreign Application Priority Data

Jun. 8, 2010 (TW) ................................ 99118476 A

(51) Int. Cl.
*G06F 3/045* (2006.01)

(52) U.S. Cl.
USPC ...... 345/174; 345/173; 178/18.01; 178/18.03; 178/19.03; 324/750.17

(58) Field of Classification Search
USPC .................. 345/173; 178/18.01, 18.03, 19.03; 324/750.17
See application file for complete search history.

(56) References Cited

U.S. PATENT DOCUMENTS 7,084,933 B2 * 8/2006 Oh et al. .......................... 349/12

* cited by examiner

*Primary Examiner* — Abbas Abdulselam
*Assistant Examiner* — Shawna Stepp Jones
(74) *Attorney, Agent, or Firm* — Muncy, Geissler, Olds & Lowe, P.C.

(57) ABSTRACT

An input apparatus with integrated detection sections of electromagnetic type and capacitive type is disclosed. The apparatus comprises a substrate, a control device and at least one signal processing device on the substrate. The substrate comprises an electromagnetic sensor coil layout and a capacitive sensor layout.

10 Claims, 3 Drawing Sheets

INPUT APPARATUS WITH INTEGRATED DETECTION SECTIONS OF ELECTROMAGNETIC TYPE AND CAPACITIVE TYPE

FIELD OF THE INVENTION

The present invention relates to an input apparatus, and more particularly to a multi-touch input apparatus with integrated detection sections of electromagnetic type and capacitive type.

DESCRIPTION OF THE PRIOR ART

Touch control and input technologies can be categorized as resistive-type, capacitive-type, electromagnetic-type and infrared-type touch control techniques depending on the types of indicators or pointers such as user's fingers, a digital pen or a stylus as well as the manner in which the location of a contact point (i.e., the location where the contact object is operably proximate the touch panel) is determined The capacitive-type touch control technique involves the use of a detection layer in the display module which can store electrical charges. Electrical sensors located at the boundaries of the touch screen of the display module apply an electrical field that is distributed across the touch screen surface, forming a distributed capacitor. In a passive touch control technique, user's fingers or a conductive device touches the screen and draws a current from the sensors. The differential in the current flows in the boundary sensors corresponds to the position of the touch on the screen. For this reason, passive capacitive touch screens do not work well when they are used with a non-conductive device, such as a hand with a glove or an inert stylus. In an active capacitive-type touch control technique, an active device emits an excitation signal at the touch point, injecting current into the sensors, and the current is measured to determine the touch position.

The electromagnetic-type touch control technique is usually applied in coordinate input apparatuses such as digitizers. The coordinate input apparatus includes sensor coils or antennas arranged along x and y axes constituting a sensor plane and an coordinate indicator such as a stylus with a resonance circuit (without battery) or a self powered digital pen. The coordinates of the indicator are obtained through signal transmitting and receiving between the indicator and the sensor coils.

However, both electromagnetic-type and capacitive-type touch control techniques have individual advantages and disadvantages respectively. For example, the electromagnetic-type touch control technique can provide precise coordinate locating but a specific indicator tool such as a stylus or an electromagnetic pen is essentially used or no reaction will present if other indicator is used. The capacitive-type touch control technique can provide various multi-touch controls with gesture by user's fingers to generate a plurality of applications. However, the resolution of the capacitive-type multi-touch control depends on the density of the matrix of the capacitive sensors and thus the precision of the touch control is limited. These advantages of the electromagnetic-type and capacitive-type touch control techniques can be concurrently obtained if both electromagnetic-type and capacitive-type touch control technique are integrated. In order to combine the high precision of the electromagnetic-type touch control technique and the convenience of the capacitive-type touch control technique and since the capacitive sensors only react or activate in close range, the capacitive sensors are located on the sensor coils. But the capacitive sensors on the sensor coils will shield, at least partially, the electromagnetic signals transmitted from or received by the input apparatus and degrade the accuracy of the electromagnetic induction and detection.

In order to solve the above-mentioned drawbacks of the conventional touch control technique, a new touch input apparatus with integrated detection sections of electromagnetic type and capacitive type which has advantages of both types is thus provided to avoid the shielding of the electromagnetic signals resulting from the capacitive sensors on the sensor coils and the decreasing of the accuracy of the electromagnetic induction and detection.

SUMMARY OF THE INVENTION

An object of the present invention is to provide a design with integrated detection sections of electromagnetic type and capacitive type to concurrently obtain the advantages of the electromagnetic-type and capacitive-type touch control techniques and to avoid the problem of shielding sensor coils from receiving electromagnetic signals by capacitive detection electrodes.

It is another object of the present invention to provide an input apparatus with dual input modes with economic cost. Since electromagnetic sensor coil layouts and a capacitive sensor layout are integrated into an input apparatus, the cost of the input apparatus of the invention is similar to that of the input apparatus with single input mode.

According to the object, one embodiment of the present invention provides an input apparatus with integrated detection sections of electromagnetic type and capacitive type. The input apparatus comprises a substrate, a control unit and at least one signal processing unit. The substrate comprises a first electromagnetic sensor coil layer, a second electromagnetic sensor coil layer, a capacitive sensor layer and a circuit layer. The first and the second electromagnetic sensor coil layers, the capacitive sensor layer and the circuit layer are laminated to form the substrate, the first electromagnetic sensor coil layer is located on the side of the substrate for capacitive touch input and electromagnetic induction input. The circuit layer includes conductive lines and circuits extending from the first and second electromagnetic sensor coil layers and the capacitive sensor layer and connecting to the control unit and the signal processing unit, the circuit layer is located on the other side of the substrate for capacitive touch input and electromagnetic induction input.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the scale of each component may not be expressly exactly.

Figure 1:
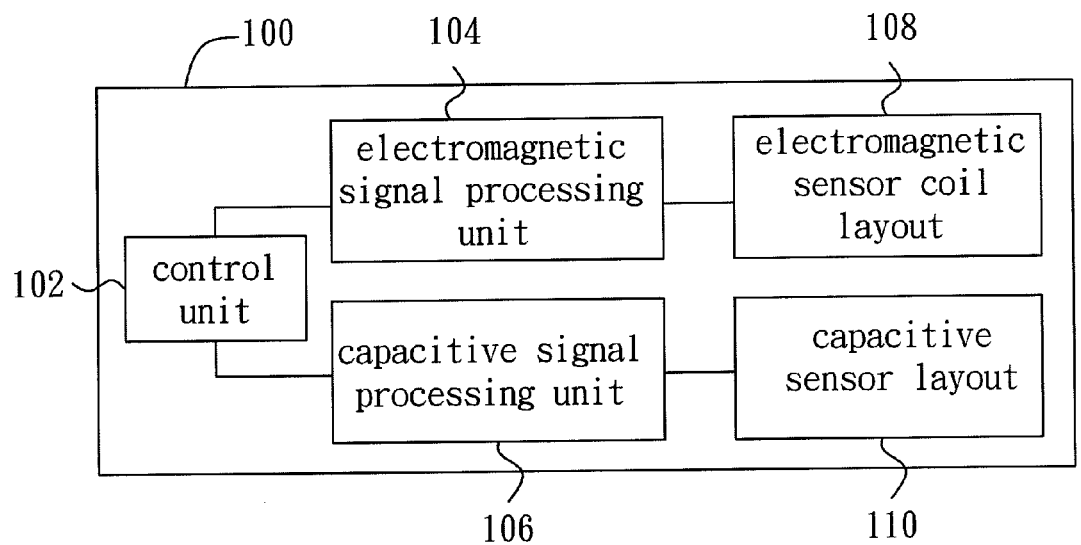
FIG. 1 shows a schematic block diagram of a multi-touch input apparatus with integrated detection sections of electromagnetic type and capacitive type according to one embodiment of the invention.

FIG. 1 shows a schematic block diagram of a multi-touch input apparatus with integrated detection sections of electromagnetic type and capacitive type according to one embodiment of the invention. The multi-touch input apparatus 100 with integrated detection sections of electromagnetic type and capacitive type comprises a control unit 102, an electromagnetic signal processing unit 104, a capacitive signal processing unit 106, an electromagnetic sensor coil layout 108 and a capacitive sensor layout 110. The control unit 102 comprises, but not limited to a micro-controller unit (MCU). The electromagnetic signal processing unit 104 and the capacitive signal processing unit 106 comprise, but not limited to, application-specific integrated circuits (ASICs). The electromagnetic sensor coil layout 108 comprises a plurality of sensor coils arranged in parallel and partially overlapped along x and y axes. One terminal of each sensor coil connects to a switch and a selecting circuit of the electromagnetic signal processing unit 104, while the other terminal connects to a ground end (COM). The sensor coils of the electromagnetic signal processing unit 104 interact with a pointer such as a digital pen or a stylus to generate electromagnetic induction and to locate the coordinates of the pointer. The control unit 102 selects the sensor coils of the electromagnetic sensor coil layout 108 through the selecting circuit of the electromagnetic signal processing unit 104 and the switches to transmit and receive electromagnetic signals by a transmitting circuit and a receiving circuit of the electromagnetic signal processing unit 104. The sensor coils of the electromagnetic sensor coil layout 108 arranged along x and y axes transmit and receive electromagnetic signals repeatedly and alternatively to determine the coordinates of the pointer. The electromagnetic signal processing unit 104 comprises, but not limited to, a signal amplifier, a phase detector and an analog to digital converter. The electromagnetic signal processing unit 104 further includes a filter circuit and a rectifier. It will be appreciated by those skilled in the art that various modifications or alternatives may be made without departing from the scope of the present invention, which is intended to be limited solely by the appended claims.

The capacitive sensor layout 110 comprises a plurality of detection electrodes and conductive lines connecting the detection electrodes to the capacitive signal processing unit 106. The detection electrodes are arranged to constitute a detection area. When an indicator such as an user's finger approach and contact the detection electrodes, a capacitor or capacitance is generated between the indicator and the detection electrode. The position that the user's finger approaches or contacts with is detected as the position of the detection electrode whose capacitance changes due to the change of the capacitance between the user's finger and the detection electrode. The change of the capacitance between the user's finger and the detection electrode is detected by the capacitive signal processing unit 106 and the coordinates of the user's finger on the detection area are calculated by the control unit 102.

Figure 2:
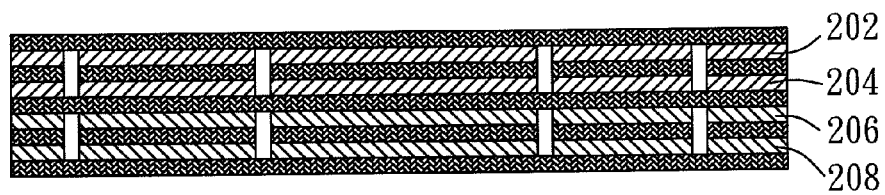
FIG. 2 shows a cross sectional view of a multi-touch input apparatus with electromagnetic sensor coil layouts and a capacitive sensor layout according to one embodiment of the invention.

FIG. 2 shows a cross sectional view of a multi-touch input apparatus with electromagnetic sensor coil layouts and a capacitive sensor layout according to one embodiment of the invention. In the embodiment, the electromagnetic sensor coil layouts and the capacitive sensor layout of the multi-touch input apparatus are integrated to form a substrate by multi-layer lamination methods. The substrate comprises, but not limited to a printed circuit board. As shown in FIG. 2, the substrate includes electromagnetic sensor coil layers 202 and 204, a capacitive sensor layer 206 and a circuit layer 208, wherein the electromagnetic sensor coil layers are located over the capacitive sensor layer 206 and on the side of the substrate for capacitive touch input and electromagnetic induction input. The substrate in FIG. 2 further includes a control unit, an electromagnetic signal processing unit, and a capacitive signal processing unit which are not shown connecting the electromagnetic sensor coil layers 202 and 204, the capacitive sensor layer 206 and the circuit layer 208 for controlling the transmitting and receiving of electromagnetic signals, the receiving of capacitive signals and the processing of the electromagnetic signals and the capacitive signals, such as the control unit 102, the electromagnetic signal processing unit 104, the capacitive signal processing unit 106. The control unit comprises, but not limited to a micro-controller unit (MCU). The electromagnetic signal processing unit and the capacitive signal processing unit comprise, but not limited to, application-specific integrated circuits (ASICs). It is noted that the embodiment of the multi-touch input apparatus includes a schematic configuration only, and thus those features which are not crucial for one with ordinary skill in the art to make and use the invention are omitted. For example, those features of the multi-touch input apparatus of the embodiment which are omitted can be practiced via any well-known prior art, and one with ordinary skill in the art can make and use the invention based on ordinary level of skill. The electromagnetic sensor coil layers 202 and 204 comprise a plurality of conductive sensor coils arranged parallel and partially overlapped along x/y or y/x axes and a connecting circuit connecting to switches and the electromagnetic signal processing unit. That is, one electromagnetic sensor coil layer includes a plurality of conductive sensor coils arranged along x axis or y axis, and the other electromagnetic sensor coil layer includes a plurality of conductive sensor coils arranged along y axis or x axis respectively. The capacitive sensor layer 206 includes a plurality of detection electrodes and conductive lines connecting the detection electrodes to the capacitive signal processing unit. The circuit layer 208 comprises conductive lines or circuit extending from the electromagnetic sensor coil layers 202 and 204, and the capacitive sensor layer 206. The electromagnetic sensor coil layers 202 and 204, the capacitive sensor layer 206 and the circuit layer 208 are laminated to form a printed circuit board, but not limited to a printed circuit board. It will be appreciated by those skilled in the art that various modifications or alternatives may be made without departing from the scope of the present invention, which is intended to be limited solely by the appended claims.

Figure 2A:
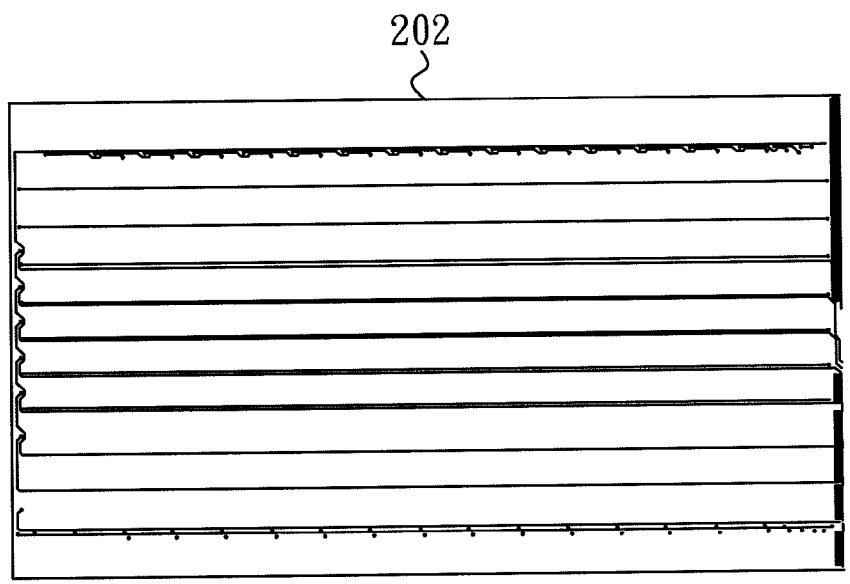
FIGS. 2A and 2B show embodiments of the electromagnetic sensor coil layers of the multi-touch input apparatus according to one embodiment of the invention.
Figure 2B:
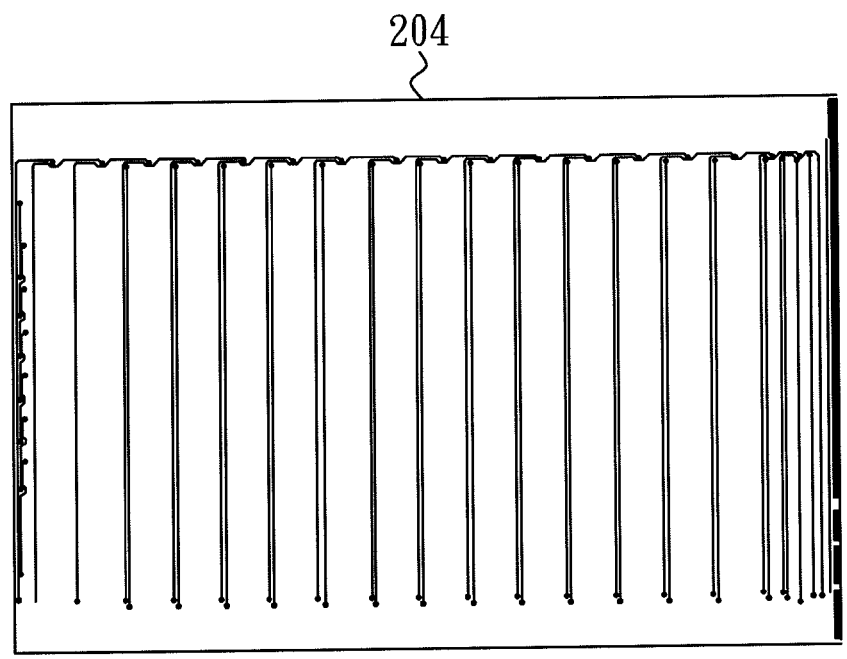

FIGS. 2A and 2B show embodiments of the electromagnetic sensor coil layers 202 and 204 of the multi-touch input apparatus according to one embodiment of the invention. As shown in FIG. 2A, the electromagnetic sensor coil layer 202 includes a plurality of conductive sensor coils arranged in parallel and partially overlapped along x axis. While in FIG. 2B, the electromagnetic sensor coil layer 204 includes a plurality of conductive sensor coils arranged in parallel and partially overlapped along y axis. The sensor coils of the electromagnetic sensor coil layers 202 and 204 extend and connect to other layers of the substrate via through holes. Various modifications or alternatives of the embodiments may be made without departing from the scope of the present invention for those skilled in the art, which is intended to be limited solely by the appended claims.

Figure 2C:
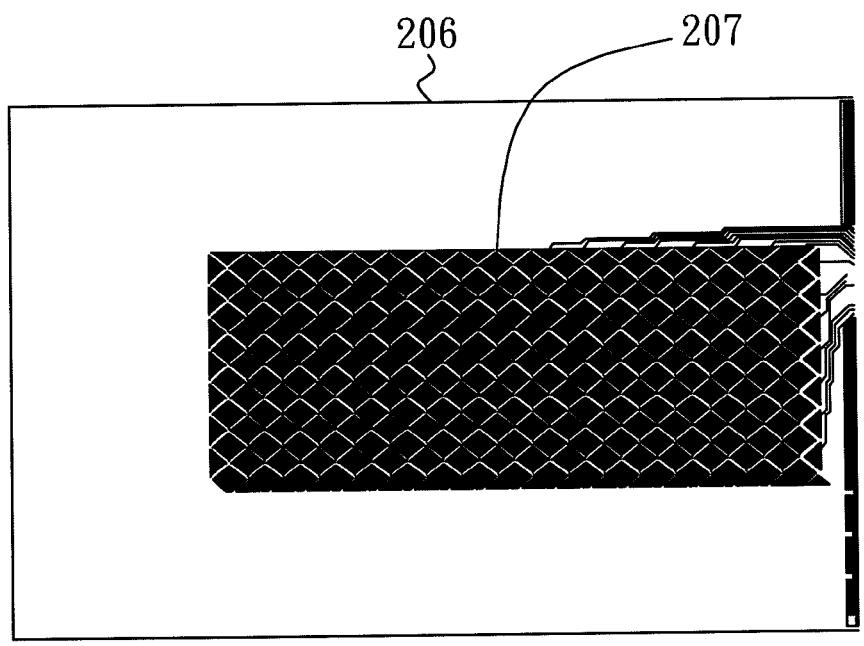
FIG. 2C shows one embodiment of the capacitive sensor layer 206 of the multi-touch input apparatus according to one embodiment of the invention.
Figure 2D:
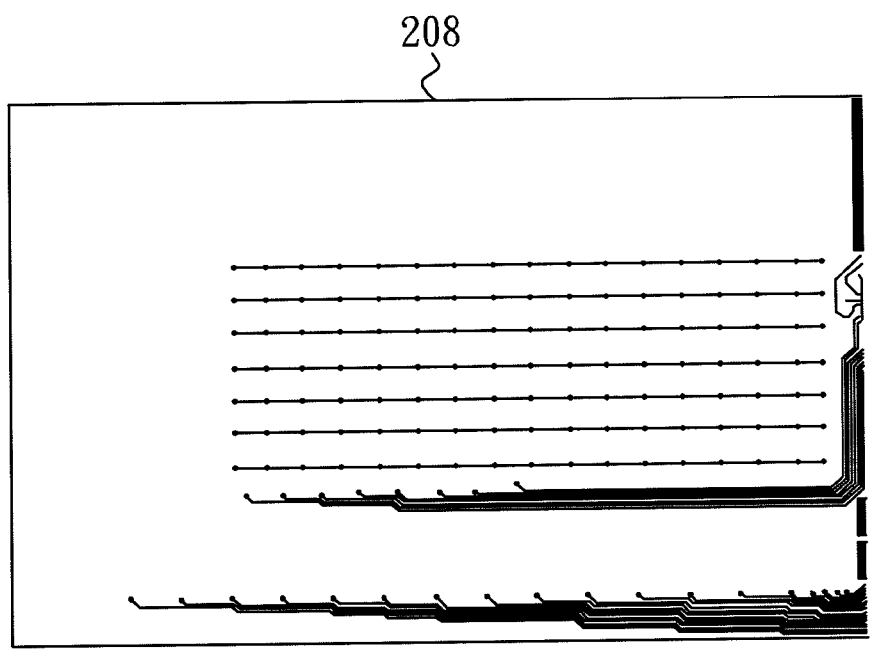
FIG. 2D shows one embodiment of the circuit layer 208 of the multi-touch input apparatus according to one embodiment of the invention.

FIG. 2C shows one embodiment of the capacitive sensor layer 206 of the multi-touch input apparatus according to one embodiment of the invention. The capacitive sensor layer 206 includes a plurality of detection electrodes 207 and conductive lines connecting the detection electrodes 207 to the capacitive signal processing unit. In FIG. 2C, the detection electrodes 207 of two adjacent columns are arranged in an interlaced manner and are connected in series by conductive lines along x and y axes respectively. It is noted that only a portion of the detection electrodes 207 are shown in FIG. 2C. It is noted that only a portion of conductive lines and circuits in the regions above and on the right side of detection area are shown in FIG. 2C. Referring to FIGS. 2A to 2C, since the electromagnetic sensor coil layers 202 and 204 are located over the capacitive sensor layer 206, the conductive lines connecting and extending from the sensor coils of the electromagnetic sensor coil layers 202 and 204 are located above the peripheral of the detection area of the capacitive sensor layer 206. FIG. 2D shows one embodiment of the circuit layer 208 of the multi-touch input apparatus according to one embodiment of the invention. The circuit layer 208 includes the conductive lines and circuits extending from the electromagnetic sensor coil layers 202 and 204 and the capacitive sensor layer 206. The circuit layer is located on the other side of the substrate for capacitive touch input and electromagnetic induction input. The conductive lines connecting and extending from the sensor coils of the electromagnetic sensor coil layers 202 and 204 are located above the peripheral of the detection area of the capacitive sensor layer 206. It is noted that the above-mentioned embodiments of the detection electrodes and the conductive lines are examples only, it will be appreciated by those skilled in the art that various modifications or alternatives of the embodiment may be made without departing from the scope of the present invention, which is intended to be limited solely by the appended claims.

The electromagnetic sensor coil layouts and the capacitive sensor layout of the substrate of the multi-touch input apparatus according to one embodiment of the invention are located on different layers in an interlaced manner as shown in FIG. 2. The electromagnetic sensor coil layouts are located over the capacitive sensor layout, and the conductive lines connecting and extending from the sensor coils of the electromagnetic sensor coil layers are located above the peripheral of the detection area of the capacitive sensor layer so that the capacitive detection will not be interfered to degrade the sensitivity even if the conductive lines are integrated densely.

The invention integrates both electromagnetic-type and capacitive-type touch control techniques to concurrently obtain the advantages of the electromagnetic-type and capacitive-type touch control techniques. The electromagnetic-type touch control technique provides high-precision positioning with an electromagnetic pointer if accurate positioning is needed and the capacitive-type touch control technique provides multi-touch input by user's gesture if specific function is applied.

Although specific embodiments have been illustrated and described, it will be appreciated by those skilled in the art that various modifications may be made without departing from the scope of the present invention, which is intended to be limited solely by the appended claims.

What is claimed is:

1. An input apparatus with integrated detection sections of electromagnetic type and capacitive type, said input apparatus comprising:
   a substrate, the substrate comprising
   a first electromagnetic sensor coil layer and a second electromagnetic sensor coil layer; and
   a capacitive sensor layer under and attached to the second electromagnetic sensor coil layer, the first and the second electromagnetic sensor coil layers and the capacitive sensor layer being laminated to form the substrate, the first electromagnetic sensor coil layer being located on the side of the substrate for capacitive touch input and electromagnetic induction input, wherein conductive lines connecting and extending from sensor coils of the electromagnetic sensor coil layers are located above the peripheral of a detection area of the capacitive sensor layer; and
   a control unit and at least one signal processing unit on the substrate connecting the electromagnetic sensor coil layers, and the capacitive sensor layer for controlling the transmitting and receiving of electromagnetic signals, the receiving of capacitive signals and the processing of the electromagnetic signals and the capacitive signals.

2. The input apparatus according to claim 1, wherein the substrate comprises a printed circuit board.

3. The input apparatus according to claim 1, wherein the first electromagnetic sensor coil layer comprises a plurality of conductive sensor coils arranged along x axis or y axis and conductive lines connecting to the control unit and the signal processing unit.

4. The input apparatus according to claim 3, wherein the conductive lines connecting and extending from the sensor coils of the first electromagnetic sensor coil layers are located above the peripheral of a detection area of the capacitive sensor layer.

5. The input apparatus according to claim 1, wherein the second electromagnetic sensor coil layer comprises a plurality of conductive sensor coils arranged along y axis or x axis and conductive lines connecting to the control unit and the signal processing unit.

6. The input apparatus according to claim 5, wherein the conductive lines connecting and extending from the sensor coils of the second electromagnetic sensor coil layers are located above the peripheral of a detection area of the capacitive sensor layer.

7. The input apparatus according to claim 1, wherein the capacitive sensor layer comprises a plurality of detection electrodes and conductive lines connecting the detection electrodes to the signal processing unit.

8. The input apparatus according to claim 1, further comprising a circuit layer including conductive lines and circuits extending from the first and second electromagnetic sensor coil layers and the capacitive sensor layer and connecting to the control unit and the signal processing unit, the circuit layer being located on the other side of the substrate for capacitive touch input and electromagnetic induction input.

9. The input apparatus according to claim 1, wherein the control unit comprises a micro-controller unit.

10. The input apparatus according to claim 1, wherein the signal processing unit comprises an electromagnetic signal processing unit and a capacitive signal processing unit.

* * * * *